United States Patent Office 3,551,242
Patented Dec. 29, 1970

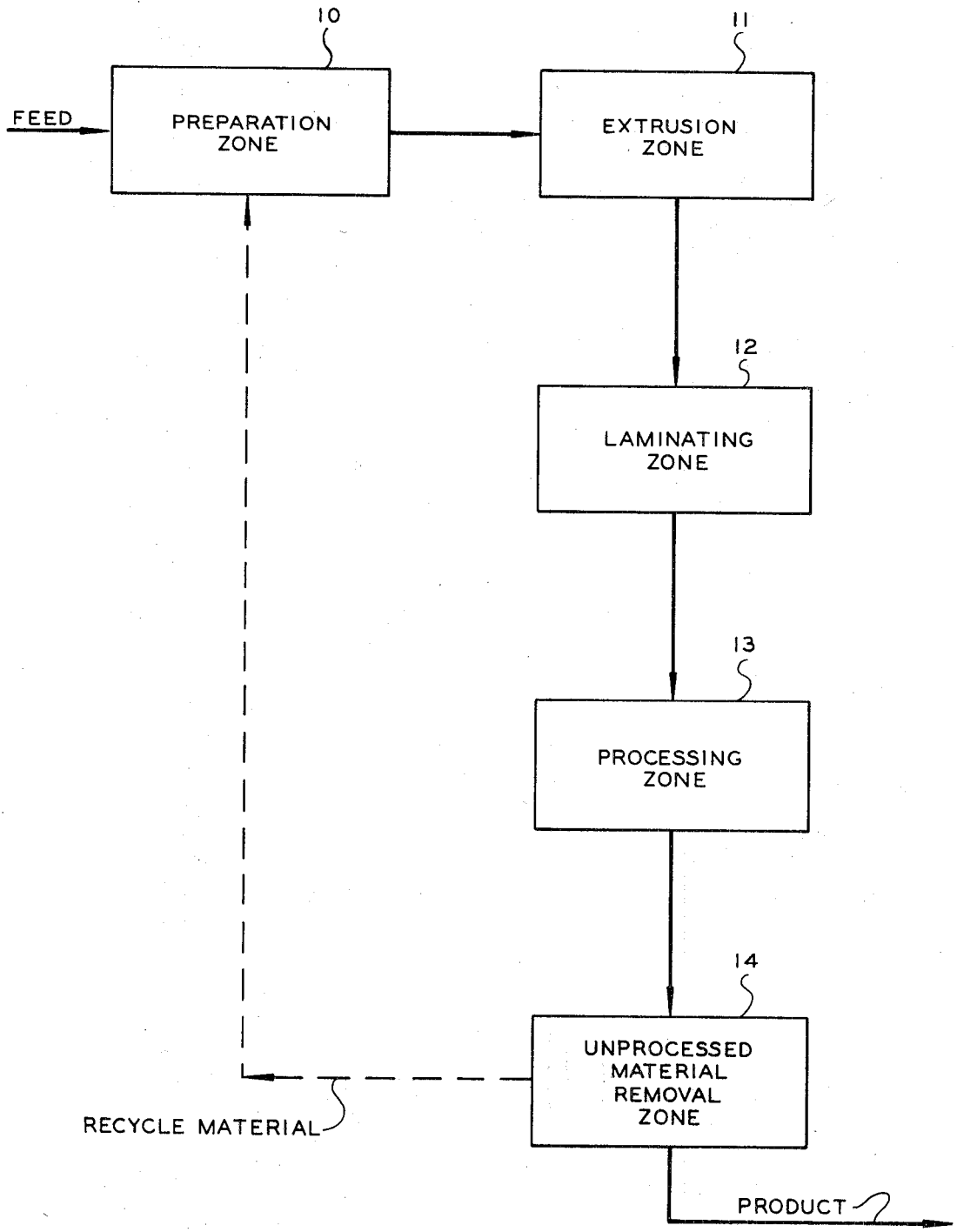

3,551,242
UNPROCESSED MATERIAL UTILIZATION THROUGH SELECTIVE CONTACT
Paul J. Boeke, Kansas City, Kans., assignor to Phillips Petroleum Company, a corporation of Delaware
Filed Dec. 19, 1966, Ser. No. 603,010
Int. Cl. B29c 29/00
U.S. Cl. 156—244                10 Claims

ABSTRACT OF THE DISCLOSURE

Recovery of waste plastic materials in industrial manufacturing operations is enhanced by a process which comprises applying a coating material such as polyvinylchloride to a substrate such as polyethylene in a predetermined geometrical pattern. Subsequent manufacturing operations affect only the coated portion of the substrate. The non-coated substrate outside the processing zone is readily recovered in condition for reuse.

---

This invention relates to a method whereby unprocessed polyolefin substrate can be recycled and utilized as feed material.

Many industrial products are manufactured from polyolefin substrates that are coated, or laminated in their entirety, during manufacturing. In this kind of manufacture, a method to recycle the unused portions of the bulk material is of unquestioned value. The unused material containing coating or laminating materials is of no value due to the coating or laminating. Many processes, well known in the art, laminate bulk materials in their entirety prior to thermoforming, blow molding, or other forming processes; however, no prior art teaches the method of laminating only those portions of the bulk material that will be actually processed, thus leaving those unused portions capable of reuse. This invention, although not limited thereto, provides a method whereby extruded but unprocessed polyolefin substrate is selectively contacted with any desired lamination materials, only in those areas that will be processed. As a result, those areas of the unprocessed bulk material which are not to be processed are available for reuse in the process. The availability of uncontaminated, unprocessed materials which are thereby rendered available for reuse in the process represents a substantial improvement over the period art which resulted in contamination of the unprocessed material.

In one embodiment, my invention comprises a process whereby polyolefin substate, or sheets, are laminated with other polymeric materials, to be later described, only in those areas of the sheets that are to be thermoformed and, as a result of this selective lamination, those areas of the sheets that will be trimmed from the thermoformed products are uncontaminated by the lamination polymers and can be reused as make-up material for additional polyolefin sheets.

Accordingly, an object of my invention is to provide a method whereby only that portion of the polyolefin substrate that is to be actually processeed is laminated, or contacted leaving the unlaminated, uncontacted, and consequently unprocessed areas available for reuse in the process.

Other objects, advantages, and features of my invention will be readily apparent to those skilled in the art from the following description, drawing, and appended claims.

The attached figure is a schematic representation of one embodiment of the inventive process.

Referring to the figure, there is a zone 10 for preparation of the crude, unprocessed polyolefin. Any polyolefin substrate having thermoplastic characteristics can be used in the practice of my invention. I find that polymers of aliphatic 1-olefins containing less than 8 carbon atoms are satisfactory; specifically, polyethylene and polypropylene are entirely satisfactory for use in my invention. In one embodiment, polyethylene made according to the method of Hogan and Banks, U.S. 2,825,721, was entirely satisfactory.

In preparation zone 10, the polyolefin to be used is prepared according to the particular requirements of the user. In most industrial operations the polyolefin will be initially received in a bag, in pellet form. If a mixture of several kinds of polyolefin is to be made, the mixture is made in this area. If coloring agents are to be added, they are added in this area. In one embodiment, pure polyethylene, made according to the method of Hogan and Banks, U.S. 2,825,721, was mixed with sufficient white pigment to produce a white substrate according to methods and proportions well known in the art. Upon removal from this area, the polyolefin has been blended according to any particular recipe desired, properly colored, and any other additives which may be desired have been added. The polyolefin is then ready for the next step of extrusion.

The said crude, unprocessed polyolefin prepared in zone 10 is then conducted to extrusion zone 11, wherein the crude unprocessed polyolefin is subjected to extrusion. The geometry of the extrusion can comprise any geometry suitable for manufacturing into the finished goods desired. Extrusion into flat sheets or generally round tubes are common extrusion forms. In one embodiment, flat sheets were extruded so that a subsequent thermoforming opertion could be conducted. The machinery for the extrusion function can be any machine capable of successfully extruding the particular polyolefin of the user.

After the extrusion function, the polyolefin is conducted from extrusion zone 11 to laminating zone 12, wherein said extruded material is laminated using highly accurate registration techniques. The laminating function can be conducted with machinery normally used in operations of this kind. The requirement of accurate registration of the laminating function is critical. According to the inventive method, only those areas to be laminated are to be processed and the remaining areas are to be reused in the process. Consequently, the thermoforming or other manufacturing step must be effected only in those areas that were laminated. This correct registration and subsequent accurate processing can be achieved with presently available equipment.

A variety of lamination materials may be laminated on the particular polyolefin chosen. Obviously, the laminate to be selected must be selected in such a manner that it will bond to the polyolefin properly. Although polyethylene and polypropylene are difficult to bond other materials to, various techniques are known in the art to provide such a bond. Specifically, such methods are disclosed in U.S. 3,031,332 and U.S. 2,968,576. Additionally, a proper bond can be effected by use of a primer coat. These methods are also well known in the art. Although any material that can be successfully bonded to the polyolefin selected can be used, polypropylene was laminated with polyvinyl chloride by use of primer coats in one embodiment. In another embodiment, polypropylene was bonded to polyvinylidene chloride using the technique of primer coats.

After the laminating function, said laminated material is conducted from laminating zone 12 into processing zone 13 wherein processing occurs only in those selected areas of the extruded material which have been selectively contacted in zone 12. The processing can comprise any operation capable of producing the finished product desired by the particular user. Blow molding or thermoforming are, but not limited thereto, entirely satisfactory processes for producing small polyolefin articles. The machinery for the processing function can comprise any machinery presently available for effecting the desired manufacturing operation. Blow molding and thermoforming machinery presently in use are satisfactory for use in my invention.

Said processed goods and unprocessed, uncontacted material appended thereto are conducted from processing zone 13 to unprocessed material removal zone 14, wherein said unprocessed and uncontacted material is severed from the processed material and is thereby rendered available for reuse as crude unprocessed material. It is in this area in which my invention lies. According to the method of my invention, the trimmed uncontacted and unprocessed material is then free from contamination by the laminates, or coatings, and can be taken to preparation zone 10, wherein the material con be reused. Conventional methods contacted the entire substrate; hence, the trimmed material was contaminated and could not be reused as pure polyolefin.

This invention is then broadly applicable to the selective contacting of any polyolefin substrate prior to processing and the reuse of those uncontaminated and unprocessed portions of the substrate.

Various modifications of this invention can be made in view of the foregoing disclosure and the appended claims without departing from the spirit or scope thereof.

In a specific embodiment of the invention, polyethylene prepared according to the method of Hogan and Banks, U.S. 2,825,721, in bulk form is extruded in flat sheets. Said flat sheets are then laminated with polyvinyl chloride by a transfer roll in a predetermined geometrical pattern that corresponds precisely to the geometry and physical dimensions of the thermoforming molds. In this case, the coating was applied to rectangular areas, spaced along the width of the sheet in rows of three, similar rows being successively imprinted on the sheet by the transfer roll. The thermoforming process is then conducted using thermoforming apparatus wherein the sheet containing the thermoformed products is subsequently trimmed of the unlaminated polyethylene. In this case, single metal end polyethylene containers for motor oil are produced, and the coated areas prevent reaction of ultraviolet light with additives in the oil, and resultant formation of a vacuum in the head space of the container. The unlaminated polyethylene is now uncontaminated with the lamination materials and, as a result, a substantial economic saving is effected by its availability for reuse as crude material. The saving is important in the case of thermoforming the described motor oil containers, because the thermoforming apparatus requires that large spaces be left between the coated areas on the roll which form the bodies of the containers. Hence, the quantity of wasted material is very substantial in the absence of practicing the present invention. Conventional processes laminated the entire bulk material; hence, the unthermoformed portions trimmed from the thermoformed portions were contaminated with the lamination materials and were therefore unavailable for reuse.

I claim:

1. A method for the production of laminated shaped articles comprising the steps of heating a thermoplastic polyolefin to extrusion temperature; extruding said heated polyolefin in substrate form; feeding and directing said substrate to a laminating zone; selectively applying a laminating material to selected unconnected areas of said polyolefin substrate, said unconnected areas being in accordance with a predetermined geometrical pattern; bonding said laminating material to said polyolefin substrate in said unconnected areas to form a laminate comprising a plurality of laminated areas separated from each other by areas of said substrate free of such laminating material; conducting the thus formed laminate to a processing zone; forming each of said plurality of laminated areas into a shaped article; separating substrate portions free of laminating material from said laminated areas; and separately recovering said substrate portions.

2. A method of claim 1 wherein the thermoplastic polyolefin is polyethylene.

3. The method of claim 1 wherein the substance to be laminated upon the polyolefin substrate comprises polyvinylchloride or polyvinylidene chloride.

4. The method of claim 1 including the step of recycling such recovered substrate portions free of laminating material to the heating step.

5. A method according to claim 1 wherein said polyolefin is a polymer or copolymer of monoolefins having up to 8 carbon atoms.

6. A method for the production of laminated shaped articles comprising feeding and directing a polyolefin film to a laminating zone; applying a laminating material to selected unconnected areas of said polyolefin film, said selected areas being in accordance with a predetermined geometrical pattern; bonding said laminating material to said polyolefin film in said selected unconnected areas to form a plurality of laminated areas separated from each by areas of said polyolefin film free of laminating material; conducting said selectively laminated polyolefin film to a processing zone; forming each of said plurality of laminated areas into a shaped article; separating said polyolefin film portions free of laminating material from said laminated areas; and separately recovering said polyolefin film portions.

7. A method according to claim 6 wherein said polyolefin is a polymer or copolymer of monoolefins having up to 8 carbon atoms.

8. A method according to claim 7 wherein said laminating material is selected from the group consisting of polyvinyl chloride or polyvinylidene chloride.

9. A method according to claim 7 wherein said polyolefin is polyethylene.

10. A method according to claim 8 wherein said polyolefin is polyethylene.

References Cited

UNITED STATES PATENTS

| 2,944,586 | 7/1960 | Yanulis | 156—244 |
| 2,948,328 | 8/1960 | Coventry | 156—244 |
| 3,033,707 | 5/1962 | Lacy et al. | 156—244 |
| 3,186,893 | 6/1965 | Mercer | 156—229 |
| 3,238,079 | 3/1966 | Mitchell et al. | 156—267 |
| 3,318,748 | 5/1967 | Hurst | 156—267 |
| 3,340,124 | 9/1967 | Lowe et al. | 156—244 |
| 3,420,679 | 1/1969 | Gifford et al. | 156—244 |

FOREIGN PATENTS

| 913,289 | 12/1962 | Great Britain | 156—244 |

BENJAMIN R. PADGETT, Primary Examiner

H. E. BEHREND, Assistant Examiner

U.S. Cl. X.R.

156—94, 267